3,253,939
TITANIUM DIOXIDE PIGMENTS
George Geoffrey Durrant and Barrie Denis Atkinson, Grimsby, England, assignors to Laporte Titanium Limited, London, England, a British company
No Drawing. Filed Feb. 14, 1963, Ser. No. 258,625
Claims priority, application Great Britain, Feb. 19, 1962, 6,378/62
10 Claims. (Cl. 106—300)

This invention relates to titanium dioxide pigments.

The present invention provides a coloured, calcined rutile titanium dioxide pigment containing from 0.04% to 5.0% of molybdenum trioxide, and from 0.02% to 0.8% of aluminium oxide, the ratio of the quantity of molybdenum trioxide to the quantity of aluminium oxide being at least 2 to 1 on a weight basis, the balance being substantially wholly titanium dioxide, and the percentages being by weight and based on the pigment.

This pigment is grey, the shade depending upon the relative proportions of the various constituents, and has a modified rutile crystallographic structure. If the molybdenum trioxide were to be omitted, the pigment would pe white, whereas, if the aluminium oxide were to be omitted, a pigment having an off-white colour would be obtained.

Advantageously, the ratio of the quantity of molybdenum trioxide to the quantity of aluminium oxide in the pigment does not exceed 50:1 on a weight basis. Advantageously, the said ratio does not exceed 18:1, and, in this case, the quantity of aluminium oxide is advantageously not less than 0.1% based on the weight of the pigment. Preferably, the ratio of the quantity of molybdenum trioxide to the quantity of aluminium oxide in the pigment is within the range of from 3:1 to 8:1, in which case the quantity of molybdenum trioxide advantageously does not exceed 1% based on the weight of the pigment.

The pigment may contain substantially 0.6% of molybdenum trioxide based on the weight of the pigment and substantially 0.3% of aluminium oxide based on the weight of the pigment. This pigment has a light grey colour.

The pigment may contain substantially 0.48% of molybdenum trioxide based on the weight of the pigment and substantially 0.1% of aluminum oxide based on the weight of the pigment. This pigment has a medium grey colour.

The pigment may contain substantially 0.68% of molybdenum trioxide based on the weight of the pigment and substantially 0.1% of aluminium oxide based on the weight of the pigment. This pigment has a dark grey colour.

In general, for a fixed quantity of molybdenum trioxide, an increase in the quantity of aluminium oxide present (up to 0.8% based on the weight of the pigment or half the weight of the molybdenum trioxide, whichever is the less) causes a darkening of the shade of the pigment. Thus for four pigments each having substantially 0.2% of molybdenum trioxide based on the weight of the pigment and containing respectively 0.02%, 0.05%, 0.07%, and 0.1% of aluminium oxide based on the weight of the pigment, the colours range from light grey for the first to dark grey for the last. If the weight of aluminium oxide were to be increased to above 0.8% based on the weight of the pigment or half the weight of the molybdenum trioxide, whichever is the less, then the colour of the pigment obtained would contain some green. If the aluminium oxide content were to be increased further the green colour would become more pronounced. Thus, in a pigment having 0.2% of molybdenum trioxide based on the weight of the pigment, if the quantity of aluminium oxide were to be increased to more than 0.1% based on the weight of the pigment, that is to say, more than half of the quantity of molybdenum trioxide, the colour of the resulting pigment becomes first grey-green and then, when the content of aluminium oxide is 0.3% based on the weight of the pigment, a green pigment is obtained.

The invention also provides a process for the manufacture of a coloured rutile titanium dioxide pigment which comprises calcining under non-reducing conditions, preferably under oxidising conditions, at a temperature within the range of from 900 to 1350° C. a mixture containing titanium dioxide, molybdenum trioxide and aluminium oxide each being present in the mixture in such a quantity that the coloured rutile titanium dioxide pigment obtained after calcination contains a quantity of molybdenum trioxide within the range of from 0.04% to 5.0%, a quantity of aluminium oxide within the range of from 0.02% to 0.8% substantially the whole of the balance being titanium dioxide, the ratio of the quantity of molybdenum trioxide in the pigment to the quantity of aluminium oxide in the pigment being at least 2:1 on a weight basis, and the percentages being by weight and based on the pigment.

Owing to the volatility of molybdenum trioxide at the calcination temperature, it is usually necessary to provide, in the mixture to be calcined, a quantity of molybdenum trioxide in excess of that required in the resultant pigment. It has been observed that, when up to 15% by weight of the mixture before calcination is molybdenum trioxide, the quantity of molybdenum trioxide retained in the calcined pigment is normally not more than about 1.8% to 2.0% based on the weight of the calcined pigment. Even when up to 40% by weight of the mixture before calcination is molybdenum trioxide, the quantity of molybdenum trioxide retained does not exceed 5% based on the weight of the calcined pigment. It follows that, when such a high proportion of molybdenum trioxide is incorporated in the mixture to be calcined, that mixture must contain a quantity of aluminium oxide considerably less than 0.8% based on the weight of the pigment in order that the quantity of aluminium oxide present after calcination shall not exceed 0.8% based on the weight of the pigment. There is substantially no loss of aluminium oxide during calcination.

The pigments produced by this process are grey coloured and have a modified rutile crystallographic structure when examined by X-ray diffraction. The titanium dioxide present in the mixture before calcination may have either the rutile or anatase crystallographic structure.

In order to obtain coloured pigments of optimum self-colour intensity and good reducing power, the particle size of the titanium dioxide should be somewhat larger than that used in the manufacture of white titanium dioxide pigments. Thus, the particle size of the titanium dioxide should be within the range of from 0.5 to 2.0 microns (measured on a calcined sample of the titanium dioxide) as compared with a particle size within the range of from 0.2 to 0.4 microns for white titanium dioxide pigments.

Advantageously, the calcination is carried out at a temperature in the range of from 1000° C. to 1200° C. Conveniently, the calcination temperature is about 1040° C.

Advantageously, before calcination, the mixture is first dried at a temperature of at least 100° C., preferably within the range of from 100 to 200° C., and then thoroughly ground and mixed.

If desired, the process may be modified in that, in the mixture to be calcined, a quantity of the said balance not exceeding 2% by weight of the said balance consists of one or more alkali metal salts that serve as pigment-texture modifiers. The alkali metal salt may be sodium or potassium sulphate and the quantity employed is advantageously within the range of from 0.1% to 1% based on the weight of titanium dioxide in the mixture. In a further modification and in addition to, or instead of, the use of a pigment texture modifier, sodium and/or potassium fluoride may be incorporated with the mixture to be calcined to serve as a colour- and brightness-improving agent. Advantageously, the quantity of fluoride used is within the range of from 0.5% to 5%, preferably about 2%, by weight based upon the calcined pigment.

If desired, the whole or a part of the molybdenum trioxide and/or the aluminium oxide may be formed in situ by incorporating with the titanium dioxide, prior to calcination, one or more compounds that decompose during the period of calcination and any preliminary drying to give the said oxide or oxides. Thus, at least a part of the aluminium oxide can be formed in situ of by the decomposition of aluminium sulphate and/or aluminium nitrate. Similarly, at least a part of the molybdenum trioxide can be formed in situ by the decomposition of molybdic acid and/or ammonium molybdate.

Hitherto, grey-colouring compositions, for example, for paints, have been made by the admixture of carbon black with a white pigment, for example, a white titanium dioxide pigment. It is quite commonly found that segregation of the constituents of such known grey-colouring compositions occurs with, of course, consequent detriment to the material containing the composition. The grey-colouring compositions of the present invention, however, are calcined pigments and are therefore free from the disadvantage of segregation of constituents.

The invention further provides a paint composition, synthetic plastic material, paper or paper laminate containing, as colouring matter, a coloured pigment in accordance with the invention or a coloured pigment manufactured by the process of the invention.

The following example illustrates the invention:

1 volume of an acid solution of titanium and iron sulphates that had been prepared in known manner and contained 152.8 grams per litre of titanium (calculated as $TiO_2$), 90 grams per litre of iron (calculated as Fe), and 455 grams per litre of sulphate (calculated as $H_2SO_4$) and was at a temperature of 70° C. was run at a uniform rate over a period of two minutes into four volumes of well-stirred water maintained at a temperature of 90° C. The temperature of the resulting solution was returned to 90° C. by heating and the temperature of the solution was maintained at 90° C. for a period of one minute, during which period the solution was continuously stirred, to form and stabilise a seeding agent. A further nine volumes of the said solution were then added at a uniform rate to the solution over a period of 6½ minutes, the solution being continuously stirred throughout that period. The resulting solution was then heated to boiling and boiled for a period of 2 hours to hydrolyse the titanium sulphate. The hydrolysis efficiency was 95.7%.

The precipitated titanium dioxide was filtered, and in conventional manner in an acid desorption stage the titanium dioxide was washed with sulphuric acid until it was substantially free from iron, chromium, and vanadium, neutralized with ammonia, and then washed until it was substantially free from sulphate.

The slurry obtained was then divided up to form a total of 26 portions. Quantities of molybdic acid and aluminium sulphate were added to nineteen of these portions of the slurry to form mixtures details of the compositions of which are given in Table 1. Each of the mixtures was dried at a temperature of 100° C., ground and mixed, and then calcined in the presence of excess air at a temperature of 1040° C. for a period of 1½ hours.

Table 1 shows the colour of the pigments formed, the percentages by weight of molybdenum trioxide and aluminium oxide (present before calcination as the said compounds) in each of the mixtures and the percentage of molybdenum trioxide present in each of the pigments formed. Substantially none of the aluminium oxide was lost during calcination. In each case, the balance was titanium dioxide.

Referring to Table 1, certain definite trends of colour variation can be seen with changes in the composition of the pigments. Thus pigments numbers 1 to 4 show that for a fixed molybdenum trioxide content in the mixture to be calcined an increase in the aluminium oxide content increases the darkness of the grey colour of the pigments. Each of the three following groups of pigments, that is to say, pigments numbers 5 and 6, pigments numbers 7 to 9, pigments numbers 10 to 13 demonstrate this trend to increasing greyness of colour with increasing aluminium oxide content.

Comparison between these three groups of pigments illustrates two further trends. First, an increase in the initial content of molybdenum trioxide increases the amount thereof retained in the pigment, and, second, the quantity of molybdenum trioxide retained increases with an increase in the quantity of aluminium oxide present.

Pigments numbers 14 to 20 are pigments that have been made by calcining mixtures containing relatively large amounts of molybdenum trioxide. In each case, the quantity of molybdenum trioxide retained does not exceed 5.0%.

The grey calcined pigments are of good colour, have good heat stability and good anti-chalking and colour-retention properties. They are thus very satisfactory for use in paints and for incorporating in synthetic plastics. They are compatible with other colouring materials for example, organic dye-stuffs.

In order to demonstrate the effect of a departure from the relative quantities of molybdenum trioxide and aluminium oxide used in the present invention on the colour of the calcined pigments, Table 2 sets out details, which correspond to those given in Table 1, of seven pigments formed under exactly similar calcination conditions to those used in preparing the above pigments from the seven remaining portions of the slurry and different relative proportions of molybdic acid and aluminium sulphate. The colours of these pigments vary from grey-green to dark green depending on the relative proportions of the constituents.

Table 1

| Pigment Number | Percent content by weight | | | Colour of pigment |
|---|---|---|---|---|
| | $MoO_3$ equivalent of molybdic acid present in mixture before calcination | $MoO_3$ after calcination | $Al_2O_3$ equivalent of aluminium sulphate present in mixture before calcination | |
| 1 | 0.2 | 0.17 | 0.02 | Grey. |
| 2 | 0.2 | 0.17 | 0.05 | Do. |
| 3 | 0.2 | 0.18 | 0.07 | Darker than Nos. 1 and 2. |
| 4 | 0.2 | 0.2 | 0.1 | Dark Grey. |
| 5 | 1.0 | 0.3 | 0.1 | Very light grey. |
| 6 | 1.0 | 0.6 | 0.3 | Dark Grey. |
| 7 | 3.0 | 0.48 | 0.1 | Grey. |
| 8 | 3.0 | 0.8 | 0.3 | Dark Grey. |
| 9 | 3.0 | 1.3 | 0.5 | Very dark grey. |
| 10 | 4.0 | 0.5 | 0.1 | Grey. |
| 11 | 4.0 | 0.9 | 0.3 | Dark grey. |
| 12 | 4.0 | 1.4 | 0.5 | Do. |
| 13 | 5.0 | 0.68 | 0.1 | Do. |
| 14 | 7.0 | 0.72 | 0.1 | Grey. |
| 15 | 10.0 | 0.9 | 0.4 | Do. |
| 16 | 15.0 | 0.7 | 0.3 | Do. |
| 17 | 20.0 | 3.2 | 0.2 | Do. |
| 18 | 40.0 | 2.35 | 0.05 | Do. |
| 19 | 40.0 | 5.0 | 0.5 | Do. |

Table 2

| Pigment Number | $MoO_3$ equivalent of molybdic acid present in mixture before calcination | $MoO_3$ after calcination | $Al_2O_3$ equivalent of aluminium sulphate present in mixture before calcination | Colour of pigment |
|---|---|---|---|---|
| 1 | 0.2 | 0.2 | 0.25 | Green/grey. |
| 2 | 0.2 | 0.2 | 0.3 | Green. |
| 3 | 1.0 | 0.7 | 0.5 | Grey/green. |
| 4 | 3.0 | 1.7 | 1.0 | Green/grey. |
| 5 | 4.0 | 1.8 | 1.0 | Do. |
| 6 | 5.0 | 2.95 | 2.0 | Dark green/grey. |
| 7 | 7.0 | 3.3 | 2.0 | Dark green. |

We claim:

1. A coloured calcined rutile titanium dioxide pigment containing from 0.04% to 5.0% of molybdenum trioxide, and from 0.02% to 0.8% of aluminium oxide, the ratio of the quantity of molybdenum trioxide to the quantity of aluminium oxide on a weight basis being at least 2:1, the balance being substantially wholly titanium dioxide, and the percentages being by weight and based on the pigment.

2. A pigment as claimed in claim 1, wherein the said ratio of the quantity of molybdenum trioxide to the quantity of aluminium oxide on a weight basis does not exceed 18:1.

3. A pigment as claimed in claim 2, wherein the quantity of aluminium oxide is at least 0.1% based on the weight of the pigment.

4. A pigment as claimed in claim 1, wherein the said ratio of the quantity of molybdenum trioxide to the quantity of aluminium oxide on a weight basis is within the range of from 3:1 to 8:1.

5. A pigment as claimed in claim 4, wherein the quantity of molybdenum trioxide does not exceed 1% based on the weight of the pigment.

6. A coloured calcined rutile titanium dioxide pigment containing from 0.04% to 5% of molybdenum trioxide, and from 0.02% to 0.8% of aluminium oxide, the ratio of the quantity of molybdenum trioxide to the quantity of aluminium oxide on a weight basis being at least 2:1, the percentages being by weight and based on the pigment, and the balance consisting of titanium dioxide and at least one substance selected from the group consisting of a pigment-texture modifier and a pigment-brightness-improving agent, the quantity of pigment-texture modifier not exceeding 2% by weight of the said balance and the said pigment-texture modifier consisting of at least one alkali metal salt, and the said pigment-brightness-improving agent consisting of at least one fluoride selected from the group consisting of sodium fluoride and potassium fluoride.

7. A pigment as claimed in claim 6, wherein the pigment contains a pigment-texture modifier that is selected from the group consisting of sodium sulphate and potassium sulphate and is present in a quantity of within the range of from 0.1% to 1% based on the weight of the calcined pigment.

8. A pigment as claimed in claim 6, wherein the pigment contains as pigment-brightness-improving agent a quantity of fluoride that is within the range of from 0.5% to 5% based on the weight of the calcined pigment.

9. A process for the manufacture of a coloured calcined rutile titanium dioxide pigment which comprises calcining under non-reducing conditions at a temperature within the range of from 900° C. to 1350° C. a mixture containing titanium dioxide, a compound selected from the group consisting of molybdic acid and ammonium molybdate, and a compound selected from the group consisting of aluminium sulphate and aluminium nitrate, each being present in the mixture in such quantity that the coloured rutile titanium dioxide pigment obtained after calcination contains from 0.04% to 5% of molybdenum trioxide, and from 0.02% to 0.8% of aluminium oxide, the ratio of the quantity of molybdenum trioxide to the quantity of aluminium oxide on a weight basis being at least 2:1, the balance being substantially wholly titanium dioxide and the percentages being by weight and based on the pigment.

10. A process for the manufacture of a coloured calcined rutile titanium dioxide pigment which comprises calcining under non-reducing conditions at a temperature within the range of from 900° C. to 1350° C. a mixture containing titanium dioxide, a compound selected from the group consisting of molybdic acid and ammonium molybdate, a compound selected from the group consisting of aluminium sulphate and aluminium nitrate, and at least one substance selected from the group consisting of at least one alkali metal salt as pigment-texture modifier and at least one fluoride selected from the group consisting of sodium fluoride and potassium fluoride as pigment-brightness-improving agent, the quantity of each component in the mixture being such that the coloured calcined rutile titanium dioxide pigment obtained after calcination contains from 0.04% to 5% of molybdenum trioxide, and from 0.02% to 0.8% of aluminium oxide, the ratio of the quantity of molybdenum trioxide to the quantity of aluminium oxide on a weight basis being at least 2:1, the percentages being by weight and based on the pigment, the balance consisting of titanium dioxide and at least one of the said substances, and when the pigment contains a pigment texture modifier the quantity thereof does not exceed 2% by weight of the said balance.

References Cited by the Examiner
UNITED STATES PATENTS 3,022,186   2/1962   Hund _____ 106—300

TOBIAS E. LEVOW, *Primary Examiner.*

J. POER, S. E. MOTT, *Assistant Examiners.*